(12) United States Patent
Lee

(10) Patent No.: US 7,982,816 B2
(45) Date of Patent: Jul. 19, 2011

(54) LIQUID CRYSTAL DISPLAY DEVICE AND METHOD OF ASSEMBLING THE SAME

(75) Inventor: Joung-Hun Lee, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 230 days.

(21) Appl. No.: 12/314,808

(22) Filed: Dec. 17, 2008

(65) Prior Publication Data

US 2010/0073590 A1 Mar. 25, 2010

(30) Foreign Application Priority Data

Sep. 23, 2008 (KR) .......................... 10-2008-0093305

(51) Int. Cl.
*G02F 1/13357* (2006.01)
*G02F 1/1333* (2006.01)
*F21V 27/02* (2006.01)

(52) U.S. Cl. ............ 349/58; 349/65; 362/632; 362/633; 362/634

(58) Field of Classification Search .............. 349/58–60, 349/64, 65; 362/97.1, 97.2, 97.4, 632–634
See application file for complete search history.

(56) References Cited

U.S. PATENT DOCUMENTS

| 6,991,349 | B2 * | 1/2006 | Wang ............................. 362/362 |
| 7,623,195 | B2 * | 11/2009 | Park et al. ....................... 349/58 |
| 2002/0034064 | A1 * | 3/2002 | Kim ............................... 361/681 |
| 2004/0125268 | A1 * | 7/2004 | An ................................. 349/58 |
| 2004/0246400 | A1 * | 12/2004 | Yeom ............................. 349/58 |
| 2005/0094054 | A1 * | 5/2005 | You et al. ........................ 349/58 |

* cited by examiner

*Primary Examiner* — Michelle R Connelly Cushwa

(74) *Attorney, Agent, or Firm* — Morgan, Lewis & Bockius LLP

(57) ABSTRACT

A liquid crystal display device and a method of assembling the same are provided to prevent coming-off of a wire and damage to the wire by improving a structure of a main support and a guide panel in an edge type liquid crystal display device and a method of assembling the same.

6 Claims, 6 Drawing Sheets

LIQUID CRYSTAL DISPLAY DEVICE AND METHOD OF ASSEMBLING THE SAME

RELATED APPLICATION

The present disclosure relates to subject matter contained in priority Korean Application No. 10-2008-0093305, filed on Sep. 23, 2008, which is herein expressly incorporated by reference in its entirety.

BACKGROUND OF THE INVENTION

1. Field of the Invention

The present invention relates to a liquid crystal display device and a method of assembling the same, and particularly, to an edge type liquid crystal display device, in which a lamp is disposed at a side of the liquid crystal display device, and a method of assembling the same.

2. Background of the Invention

In the recent information age, displays are becoming more and more important as a visual information transmission media. In order to hold an important position in the future, the displays have to meet the following conditions such as a low power consumption, a thin thickness, a light weight, a high picture quality and so on.

The displays are categorized into luminous types, such as a CRT (cathode ray tube), EL (electroluminescent), LED (light emitting diode), VFT (vacuum fluorescent display), FED (field emission display), and PDP (plasma display panel), that emit light by themselves, and non-luminous types, such as a liquid crystal display device, that does not emit light by themselves.

A liquid crystal display (LCD) device displays an image by using optical anisotropy of a liquid crystal material. In addition, the LCD device has better viewing characteristic and has lower average power consumption and heat generation than CRTs having the same screen size. The LCD devices are drawing great attention as one of the next generation display devices along with PDPs.

A liquid crystal material used in the LCD device is not a spontaneous light emitting material, but material receptive of light for displaying an image by modulating an amount of external light. Thus, in the conventional LCD device, an additional light source for irradiating light to a LCD panel, that is, a backlight unit is required.

Hereinafter, the liquid crystal display device will be described in detail.

Unless specially mentioned below, in a completed liquid crystal display device, a portion where a lamp is disposed is called a lower part, and a portion where a liquid crystal display panel is disposed is called an upper part.

The liquid crystal display device largely includes a liquid crystal display panel having liquid crystal injected between an array substrate and a color filter substrate, for outputting an image, a backlight unit installed at a lower portion of the liquid crystal display panel to emit light to the front surface of the liquid crystal display panel, and a plurality of case parts for fixing and coupling the liquid crystal display panel and the backlight unit to each other.

The function of the backlight unit is to produce a flat light having a uniform brightness from a lamp used as a light source, and the thickness and power consumption of the liquid crystal display panel are dependent upon how thin the profile of the backlight unit is and how efficiently light is used.

The backlight units are classified into an edge type and a direct type according to the position of a light source relative to a display plane. In the edge-type device, a light source is disposed at least one side of the liquid crystal display panel, and light is reflected, diffused, and collected through a reflection plate, a light guide plate, and sheets to be transmitted to the front surface of the liquid crystal display panel.

Hereinafter, a structure of the edge type liquid crystal display device will be described in detail with reference to the drawings.

FIG. 1 is a perspective view schematically showing a structure of a general edge type liquid crystal display device. FIG. 2 is a view schematically showing a cross section taken along line A-A' in the general edge type liquid crystal display device shown in FIG. 1.

For the convenience of explanation, FIGS. 1 and 2 show a state in which the liquid crystal display device is turned over such that the top may face down.

As shown therein, the general edge type liquid crystal display device includes a main support 50 having a stepped coverage face formed therein, a backlight unit and a liquid crystal display panel 10 that are sequentially stacked on the stepped coverage face of the main support 50, a guide panel 30 disposed between the backlight unit and the liquid crystal display panel 10 to support the liquid crystal display panel 10 and secured to a side of the main support 50, and a top case (not shown) for covering and fixing the upper edge of the liquid crystal display panel 10 and the guide panel 30.

The main support 50 is a mold material made from plastic, and its inner lateral wall is molded into a stepped coverage face. The backlight unit and the liquid crystal display panel 10 are sequentially stacked on the stepped coverage face of the main support 50. In addition, a wire fixation part 55 for accommodating and fixing a wire 45 of the lamp assembly 42 is formed at one side of the main support 50.

In addition, the backlight unit includes a lamp (not shown) which is supplied with power from an external power source to irradiate light, a light guide plate 43 which guides light incident through a side face facing the lamp to the liquid crystal display panel 10, a lamp assembly 42 including the lamp and the wire 45 for supplying power to the lamp, a reflecting sheet 41 disposed at the rear surface of the light guide plate 43, a plurality of optical sheets 44 to improve the efficiency of the light coming out of the light guide plate 43, thereby illuminating the liquid crystal display panel 10.

The lamp assembly 42 includes a lamp including an L-shaped or straight glass tube and a high voltage electrode and a low voltage electrode formed at both ends of the glass tube, a high voltage wire 45a connected to the high voltage electrode of the lamp by soldering, and a low voltage wire 45b connected to the low voltage electrode of the lamp by soldering.

The high and low voltage electrodes soldered with the wires 45a and 45b are covered with an insulating holder. Further, the high and low voltage wires 45a and 45b are connected to outside of the LCD device, for example, to a connector through the wire fixation part 55 formed at the main support 50.

The wire fixation part 55 formed at the main support 50 has a reversed L-shaped structure by being extended to the inside of the main support 50. A space between an end of the wire fixation part 55 and the inside of the main support 50 forms an insertion part 51 through which the wire 45 is inserted.

However, the wire 45 inserted through the insertion part 51 and accommodated in the main support 50 cannot prevent movement of the wire 45 in the accommodating direction (z-axis direction) of the wire 45, and hence the accommodated wire 45 comes off upon a pre-delivery inspection or upon handling.

Hereupon, if the width of the insertion part 51 is decreased in order to prevent the wire 45 from coming off, a contraction tube covering the wire 45 is torn apart upon insertion or a stress is concentrated on a weak portion to cause deformation.

As seen above, unless the wire 45 accommodated in the wire fixation part 55 is forcedly fixed by attaching a tape or inserting a fixing foam, there is the possibility that the accommodated wire 45 may come off upon securing for an inspection during a module process or while handling the product.

However, in case of inserting a fixing foam, the tact time increases due to an additional process in the backlight manufacturing process, and the cost for an additional single item and the cost for the additional process are incurred.

SUMMARY OF THE INVENTION

The present invention has been made in an effort to solve the foregoing problems, and an object of the present invention is to provide an edge type liquid crystal display device, which prevents coming-off of a wire and damage to the wire, and a method of assembling the same.

These and other objects and features of the present invention will become more fully apparent from the following description and appended claims, To accomplish the above object, there is provided a liquid crystal display device according to the present invention, comprising: a main support having a stepped coverage face formed therein and an L-shaped first wire fixation part provided at one side; a backlight unit and a liquid crystal display panel stacked on the stepped coverage face of the main support; a guide panel disposed between the backlight unit and the liquid crystal display panel to support the liquid crystal display panel, and provided with a reversed L-shaped second wire fixation part at one side and secured to a side of the main support; a lamp which is supplied with power from an external power source to irradiate light; a wire for supplying power to the lamp, and fixed by the first wire fixation part and the second wire fixation part; and a top case for covering and fixing the upper edge of the liquid crystal display panel and the guide panel.

Additionally, there is provided a method of assembling a liquid crystal display device according to the present invention, comprising the steps of: stacking a liquid crystal display panel on the inner stepped coverage face of a main support having an L-shaped first wire fixation part provided at one side; securing a lamp assembly with a wire secured to a lamp to a side of the main support; arranging the wire of the lamp assembly and inserting and accommodating the same in the first wire fixation part of the main support; positioning a guide panel having a reversed L-shaped second wire fixation part provided at one side on the top portion of the main support; mounting and securing the guide panel on the side of the main support such that the reversed L-shaped second wire fixation part is fitted and coupled to the L-shaped first wire fixation part; and pressing an upper edge of the liquid crystal display panel by using a top case and securing the same to the guide panel.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, a liquid crystal display device and a method of assembling the same according to a preferred embodiment of the present invention will be described in detail with reference to the accompanying drawings.

Figure 1:
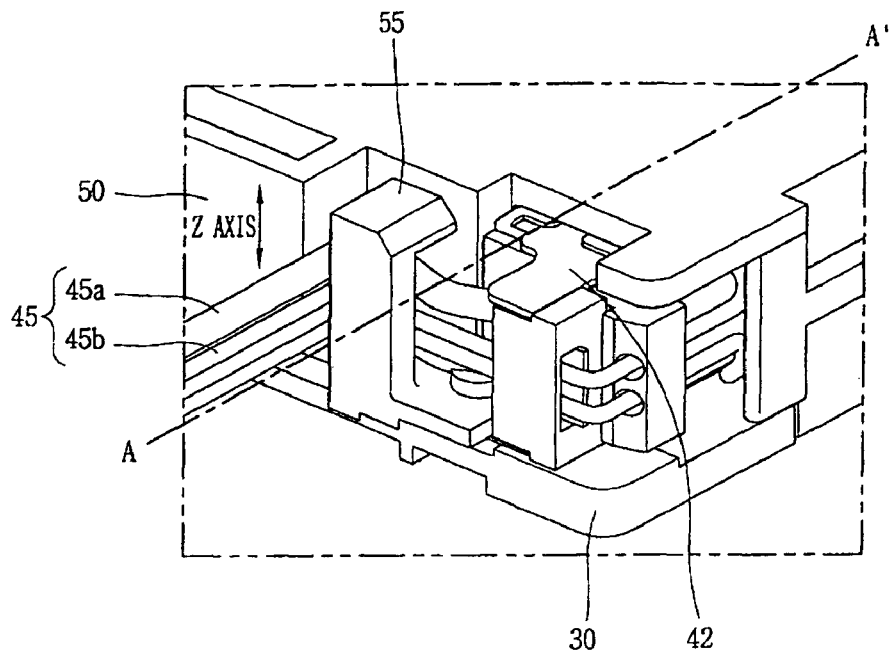
FIG. 1 is a perspective view schematically showing a structure of a general edge type liquid crystal display device.
Figure 2:
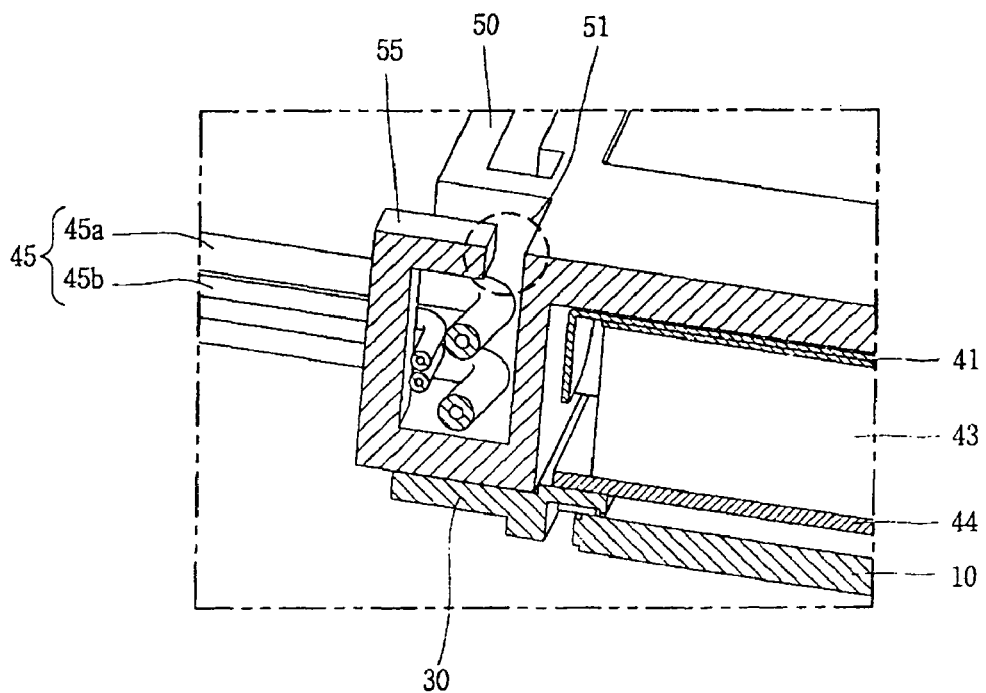
FIG. 2 is a view schematically showing a cross section taken along line A-A' in the general edge type liquid crystal display device shown in FIG. 1.
Figure 3:
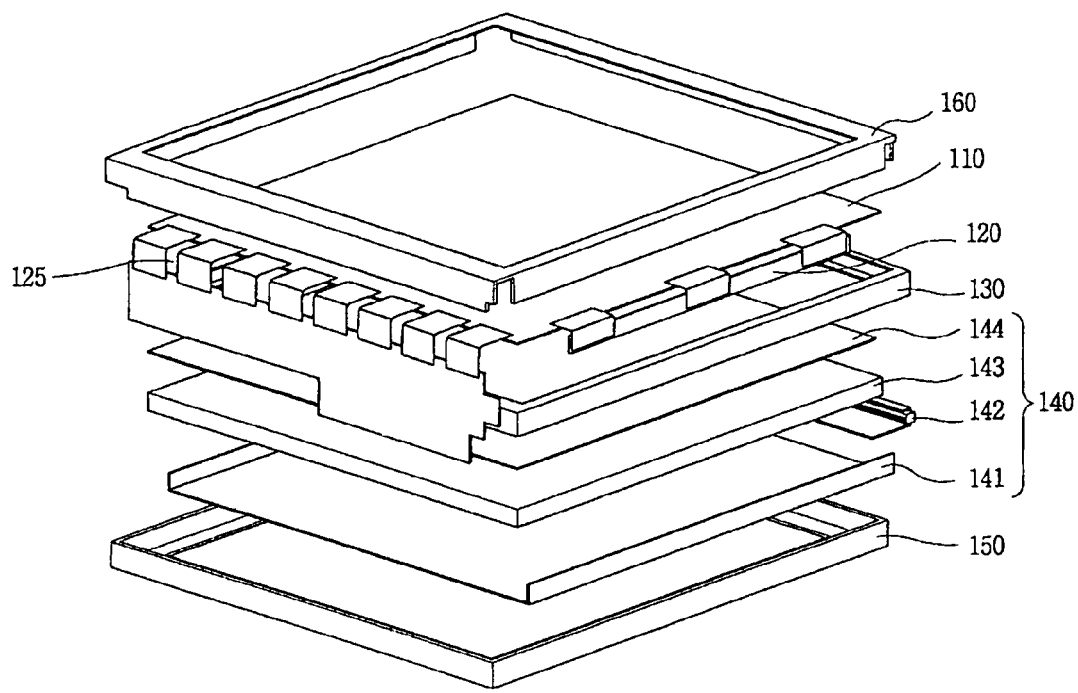
FIG. 3 is an exploded perspective view schematically showing a liquid crystal display device according to an embodiment of the present invention.

FIG. 3 is an exploded perspective view schematically showing a liquid crystal display device according to an embodiment of the present invention.

As shown therein, the liquid crystal display device according to the embodiment of the present invention includes a liquid crystal display panel 110 having pixels arranged in a matrix form, a gate driving unit 120 and a data driving unit 125 connected at the sides of the liquid crystal display panel 110, a backlight unit 140 disposed at a lower portion of the liquid crystal display panel 110 to supply light to the liquid crystal display panel 110, and a variety of case parts, such as a top case 160 and a bottom cover (not shown).

Though not shown in detail, the liquid crystal display panel 110 largely includes a color filter substrate, an array substrate, and a liquid crystal layer formed between the color filter substrate and the array substrate.

The color filter substrate includes a color filter having red, green, and blue (R, G and B) sub color filters for implementing colors, a black matrix formed between the sub color filters that blocks light transmitted through the liquid crystal layer, and a transparent common electrode that applies a voltage to the liquid crystal layer.

The array substrate includes a plurality of gate lines arranged lengthwise on the substrate and a plurality of data lines arranged widthwise on the substrate to define a plurality of pixel regions, thin film transistors (TFTs), which are switching devices, formed at intersections of the gate lines and the data lines, and pixel electrodes formed on the pixel regions.

A common electrode and a pixel electrode are formed on the liquid crystal display panel 110 on which the color filter substrate and the array substrate are attached to each other, to apply an electrical field to the liquid crystal layer formed between the color filter substrate and the array substrate.

Accordingly, if a voltage of a data signal applied to the pixel electrode is controlled in a state that a voltage has been applied to the common electrode, liquid crystals of the liquid crystal layer rotate due to dielectric anisotropy according to the electric field between the common electrode and the pixel electrode to transmit or shield light for each pixel to thereby display a character or an image.

The backlight unit 140 includes a light guide plate 143 disposed on a lower portion of the liquid crystal display panel 110, a lamp assembly 142 disposed at a side of the light guide plate 143, a reflecting plate 141 disposed below the light guide plate 143, and optical sheets 144 disposed between the liquid crystal display panel 110 and the light guide plate 143.

Light generated from the lamp assembly 142 enters the side of the light guide plate 143 formed of a transparent material. The reflecting plate 141 disposed below the light guide plate 143 reflects the light transmitted to the rear surface of the light guide plate 143 on the upper surface of the light guide plate 143, thereby reducing light loss and improving the uniformity of light transmitted to the upper surface of the light guide plate 143.

The optical sheets 144 disposed between the liquid crystal display panel 110 and the light guide plate 143 may include a diffusion sheet and a prism sheet. A protective sheet may be additionally included.

The diffusion sheet disperses light incident from the light guide plate 143, thereby preventing light from being partially concentrated to form spots on an image displayed on the liquid crystal display panel 110, and vertically refracts the angle of the light incident from the light guide plate 143.

The prism sheet collects light incident from the diffusion sheet and uniformly distributes the light over the entire surface of the liquid crystal display panel 110.

The protective sheet functions to protect the optical sheets 144 sensitive to dust or scratches, and prevents the optical sheets 144 from moving upon handling the backlight unit 140.

The sides of the thus-constructed liquid crystal display panel 110 and backlight unit 140 are covered by the guide panel 130, and the covered liquid crystal display panel 110 and backlight unit 140 are sequentially stacked on the inner stepped coverage face of the main support 150.

An upper edge of the liquid crystal display panel 110 is pressed by the top case 160. The top case 151 is coupled with the guide panel 130.

The top case 160 is manufactured in a rectangular strip shape having planar portions and side portions that are bent at a right angle. The top case 160 covers and fixes the upper edge of the liquid crystal display panel 110 and the sides of the guide panel 130.

Here, in the liquid crystal display panel according to the embodiment of the present invention, a closed structure is formed by forming an L-shaped first wire fixation part on the main support, forming a reversed L-shaped second wire fixation part on the guide panel corresponding to the first wire fixation part and fitting and coupling the second wire fixation part to the first wire fixation part in which the wire is accommodated, thereby preventing movement of the accommodated wire. As a result, the coming off of the wire and damage to the wire can be prevented, and the injection molding of a mold material can be easily performed by forming first and second projections on the first and second wire fixation parts of the main support and guide panel. This will be described in detail with reference to the accompanying drawings.

Figure 4:
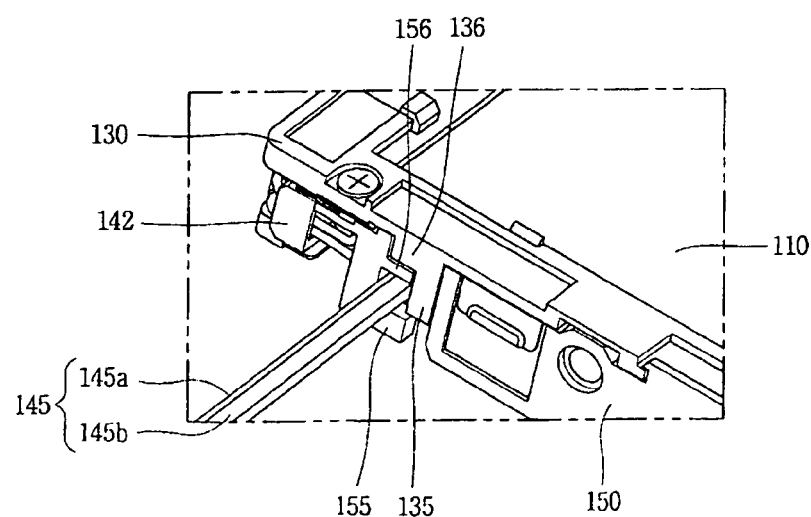
FIGS. 4 to 6 are views schematically showing an edge type liquid crystal display device according to the embodiment of the present invention.
Figure 5:
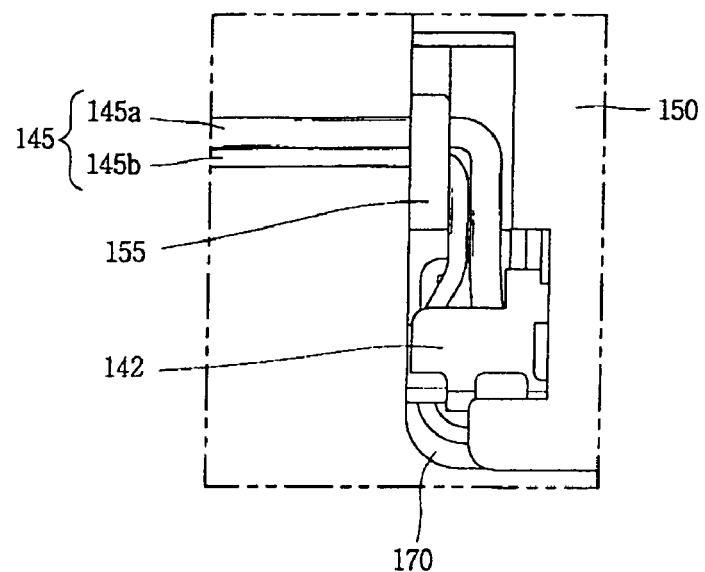
Figure 6:
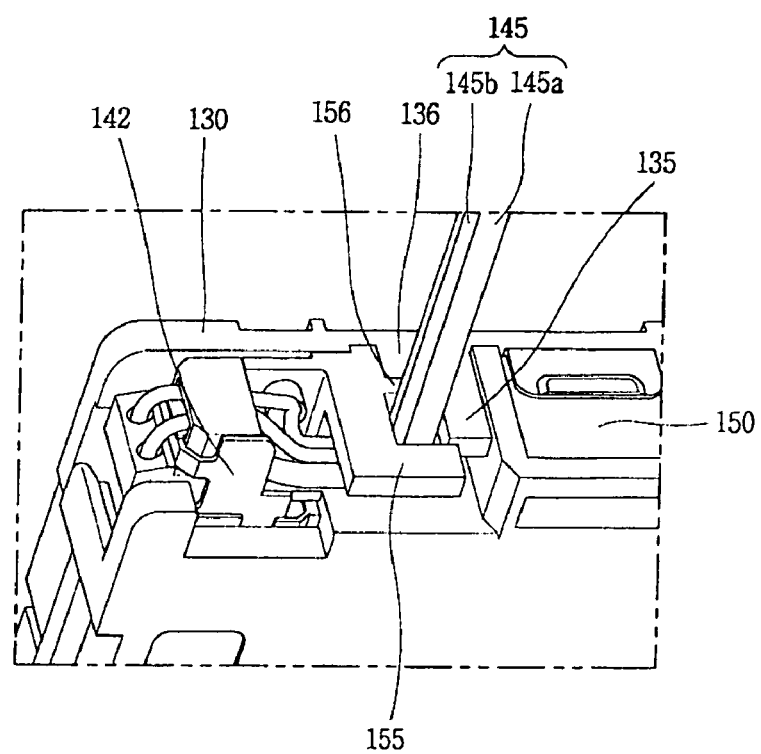

FIGS. 4 to 6 are views schematically showing an edge type liquid crystal display device according to the embodiment of the present invention.

FIGS. 5 and 6 show a state in which the liquid crystal display device as shown in FIG. 4 is turned over such that the top may face down.

As shown therein, the edge type liquid crystal display device according to the embodiment of the present invention includes a main support 150 having a stepped coverage face formed therein, a backlight unit and a liquid crystal display panel 110 that are sequentially stacked on the stepped coverage face of the main support 150, a guide panel 130 disposed between the backlight unit and the liquid crystal display panel 110 to support the liquid crystal display panel 110 and secured to a side of the main support 150, and a top case (not shown) for covering and fixing the upper edge of the liquid crystal display panel 110 and the guide panel 130.

The main support 150 is a mold material made from plastic, and its inner lateral wall is molded into a stepped coverage face. The backlight unit and the liquid crystal display panel 110 are sequentially stacked on the stepped coverage face of the main support 150.

In addition, a first wire fixation part 155 for accommodating and fixing a wire 145 of the lamp assembly 142 is formed at one side of the main support 150, and a second wire fixation part 135 for preventing the wire 145 accommodated in the first wire fixation part 155 from moving in the accommodating direction (z-axis direction) is formed at one side of the guide panel 130 corresponding to the first wire fixation part 155.

Though not shown, the backlight unit includes a lamp which is supplied with power from an external power source to irradiate light, a light guide plate which guides light incident through a side face facing the lamp toward the liquid crystal display panel 110, a lamp assembly 142 including the lamp and the wire 145 for supplying power to the lamp, a reflecting sheet disposed at the rear surface of the light guide plate, a plurality of optical sheets to improve the efficiency of the light coming out of the light guide plate, thereby illuminating the liquid crystal display panel 110.

The lamp assembly 142 includes a lamp including an L-shaped or straight glass tube and a high voltage electrode and a low voltage electrode formed at both ends of the glass tube, a high voltage wire 145$a$ connected to the high voltage electrode of the lamp by soldering, and a low voltage wire 145$b$ connected to the low voltage electrode of the lamp by soldering.

The high and low voltage electrodes soldered with the wires 145$a$ and 145$b$ are covered with an insulating holder. Further, the high and low voltage wires 145$a$ and 145$b$ are connected to outside of the LCD device, for example, to a connector through the first wire fixation part 155 and second wire fixation part 135 formed respectively at the main support 150 and guide panel 130.

Figure 7A:
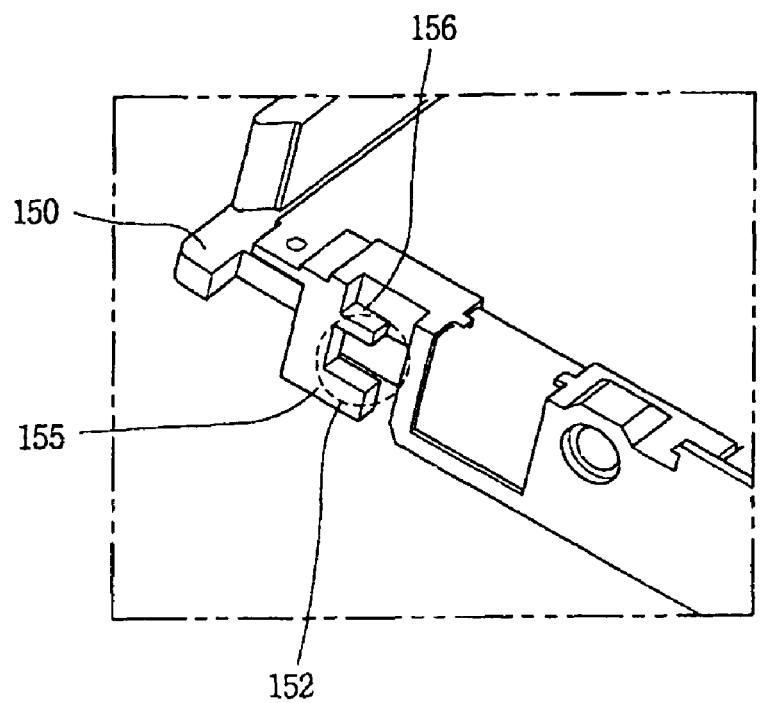
FIGS. 7A and 7B are perspective views showing a structure of the main support and the guide panel according to the embodiment of the present invention in the edge type liquid crystal display device as shown in FIGS. 4 to 6.
Figure 7B:
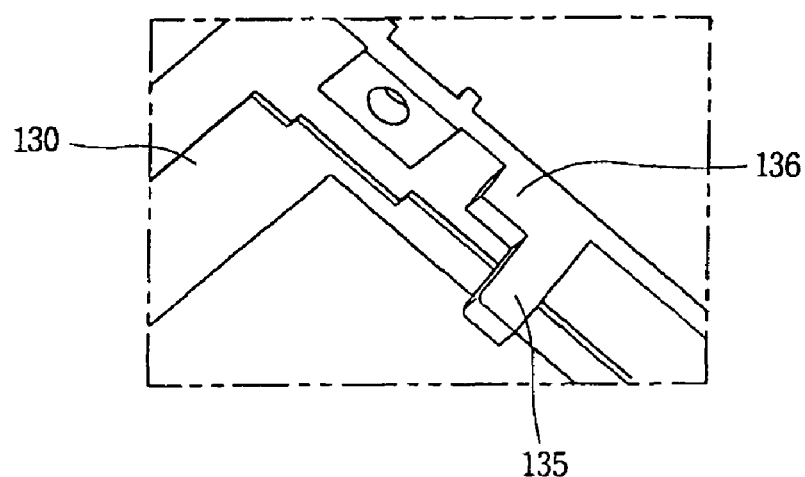

FIGS. 7A and 7B are perspective views showing a structure of the main support and the guide panel according to the embodiment of the present invention in the edge type liquid crystal display device as shown in FIGS. 4 to 6.

First, as shown in FIG. 7A, the main support 150 according to the embodiment of the present invention is a mold material made from plastic, and its inner lateral wall is molded into a stepped coverage face. The backlight unit including the lamp assembly and the liquid crystal display panel 110 are sequentially stacked on the stepped coverage face of the main support 150.

A first wire fixation part 155 for accommodating and fixing the wire of the lamp assembly is formed at one side of the main support 150.

Here, the first fixation part 155 of the main support 150 has an L-shape by being extended in a direction parallel to the side of the main support 150, and is provided with a first projection 156 projected to one side of the first wire fixation part 155. An inner space between the L-shaped first wire fixation part 155 and the first projection forms a mounting portion 152 where the wire 145 is inserted and mounted.

Referring to FIG. 4, the wire 145 mounted on the mounting portion 152 of the main support 150 can be prevented from moving in the z-axis direction as the mounting portion 152 forms a closed structure by the second wire fixation part 135 of the guide panel 130 fitted and coupled to the first wire fixation part 155 of the main support 150. As a result, the coming off of the accommodated wire 145 during the above-stated pre-delivery inspection or upon handling can be basically prevented.

That is to say, as shown in FIG. 7B, the guide panel 130 according to the embodiment of the present invention is a mold material made from plastic, and supports the liquid crystal panel 110 and is sequentially stacked on the upper surface of the main support 150 to cover the side of the main support 150.

The guide panel 130 is provided with a reversed L-shaped second wire fixation part 135 at one side corresponding to the first wire fixation part 155 of the main support 50 to fix the wire 145 mounted on the mounting portion 152 of the main support 150.

The reversed L-shaped second wire fixation part 135 includes a predetermined second projection 136 to be fitted and coupled to the first wire fixation part 155 and first projection 156 of the main support 150.

As seen from above, a closed structure is formed by forming an L-shaped first wire fixation part 155 on the main support 150, forming a reversed L-shaped second wire fixation part 135 on the guide panel 130 corresponding to the first wire fixation part 155 and fitting and coupling the second wire fixation part 135 to the first wire fixation part 155 in which the wire 145 is accommodated, thereby preventing movement of the accommodated wire 145.

In addition, unlike the conventional art, there is no need to reduce the width of the insertion part to prevent the coming off of the wire 145, and hence the problem of damage to the wire 145 upon insertion of the wire 145 can be prevented.

Moreover, the injection molding of a mold material can be easily performed by forming first and second projections 156 and 136 on the first and second wire fixation parts 155 and 135 of the main support 150 and guide panel 130.

Besides, since a conventional fixing foam does not need to be inserted, the process for inserting a fixing foam in a backlight manufacturing process is eliminated, thereby decreasing the tact time and incurring no cost for an additional single item and no cost for an additional process.

Figure 8A:
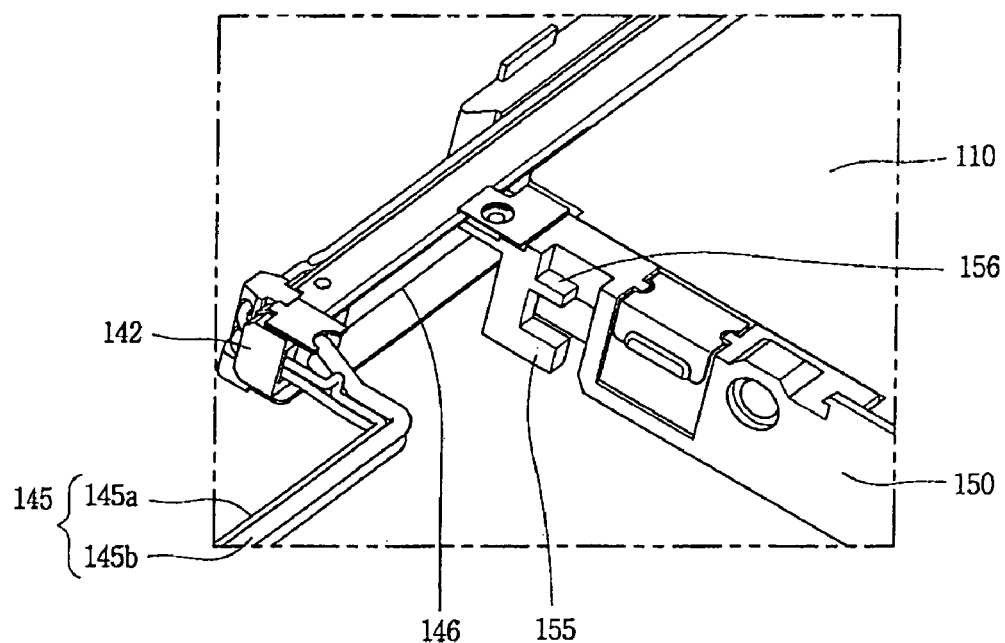
FIGS. 8A to 8C are perspective views sequentially showing a method of assembling a liquid crystal display device according to the embodiment of the present invention.
Figure 8B:
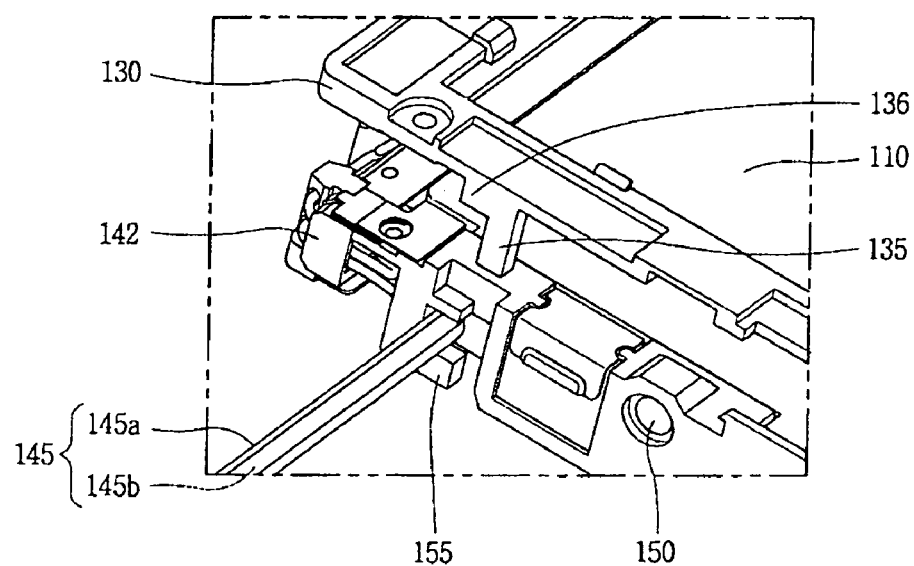
Figure 8C:
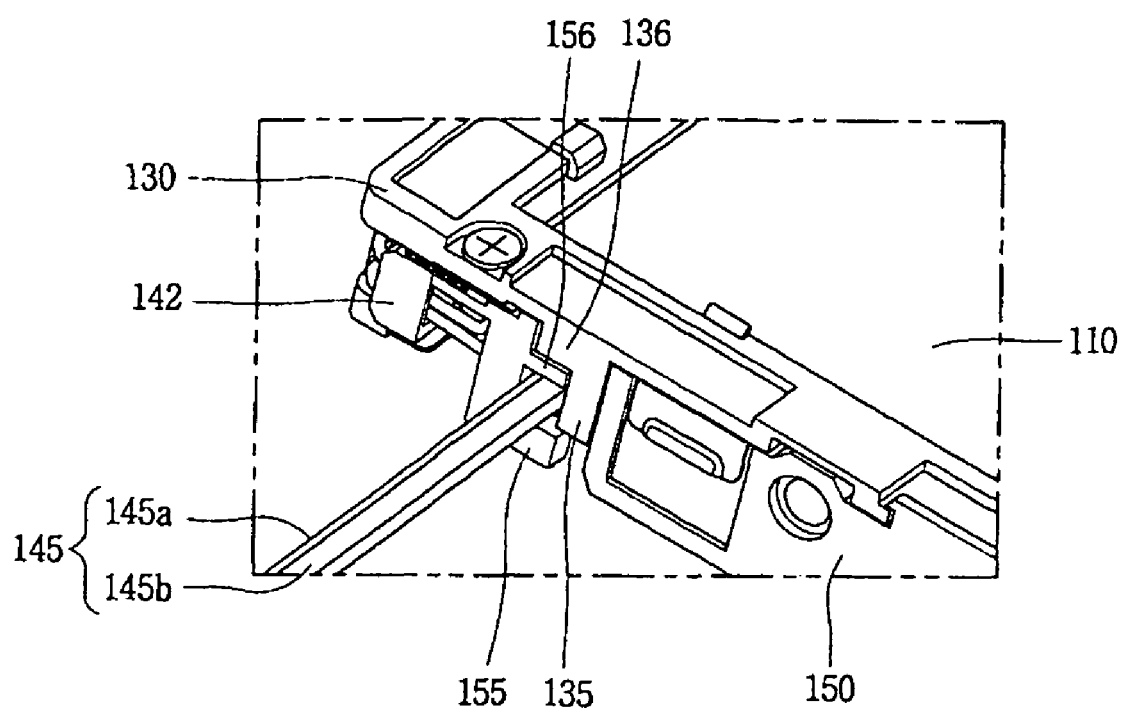

FIGS. 8A to 8C are perspective views sequentially showing a method of assembling a liquid crystal display device according to the embodiment of the present invention.

First, as shown in FIG. 8A, a lamp assembly 142 with a wire 145 secured to a lamp is secured to a side of a main support 150. The lamp assembly 142 can be inserted and secured to a side of the main support 150 by sliding.

A backlight unit including a reflection sheet, a light guide plate, and optical sheets, and a liquid crystal display panel 110 are sequentially accommodated on the inner stepped coverage face of the main support 150. The liquid crystal display panel 110 includes a color filter substrate, an array substrate, and a liquid crystal layer formed between the color filter substrate and the array substrate.

As shown in FIG. 8B, the wire 145 of the lamp assembly 142 is arranged, and inserted into a first wire fixation part 155 of the main support 150 and accommodated in a mounting portion.

With the wire 145 of the lamp assembly 142 being accommodated in the mounting portion of the main support 150, a guide panel 130 is positioned on the top portion of the main support 150. The guide panel 130 is positioned such that a reversed L-shaped second wire fixation part 135 of the guide panel 130 corresponds to an L-shaped first wire fixation part 155 of the main support 150.

Next, as shown in FIG. 8C, the guide panel 130 is mounted on a side of the main support 150 and then secured to each other by screws or the like such that the reversed L-shaped second wire fixation part 135 is fitted and coupled to the L-shaped first wire fixation part 155.

Afterwards, the upper edge of the liquid crystal display panel 110 is pressed by a top case (not shown), and the top case is coupled with the guide panel 130.

While the foregoing description sets forth many specific details, these specific details should not be construed as limitations on the scope of the invention, but rather as examples of preferred embodiments thereof. As would be apparent to one of ordinary skill in the art, many other variations on the system operation are possible, including differently grouped and ordered method steps. Accordingly, the scope of the invention should be determined not by the embodiments illustrated, but by the appended claims and their equivalents.

What is claimed is:

1. A liquid crystal display device, comprising:
   a main support having a stepped coverage face formed therein;
   an L-shaped first wire fixation part having an extended portion extended in a length direction of a side of the main support;
   a first projection protruded from one side of the first wire fixation part and in the length direction of the side of the main support;
   a backlight unit and a liquid crystal display panel stacked on the stepped coverage face of the main support;
   a guide panel disposed between the backlight unit and the liquid crystal display panel to support the liquid crystal display panel;
   a reversed L-shaped second wire fixation part extended in a width direction of a side of the guide panel;
   a second projection protruded from the second wire fixation part and put on the first projection;
   a lamp which is supplied with power from an external power source to irradiate light;
   a wire for supplying power to the lamp, and fixed by the first wire fixation part and the second wire fixation part; and
   a top case for covering and fixing the upper edge of the liquid crystal display panel and the guide panel.

2. The liquid crystal display device of claim 1, wherein an inner space between the L-shaped first wire fixation part and the first projection forms a mounting portion where the wire is inserted and mounted.

3. The liquid crystal display device of claim 2, wherein, as the wire is mounted on the mounting portion of the main support and the second wire fixation part of the guide panel is fitted and coupled to the first wire fixation part of the main support, the wire is prevented from moving.

4. A method of assembling a liquid crystal display device, comprising the steps of:
   stacking a liquid crystal display panel on the inner stepped coverage face of a main support having an L-shaped first wire fixation part having an extended portion extended in a length direction of a side of the main support;
   providing a first projection protruded from one side of the first wire fixation part and in the length direction of the side of the main support;
   securing a lamp assembly with a wire secured to a lamp to a side of the main support;

arranging the wire of the lamp assembly and inserting and accommodating the same in the first wire fixation part of the main support;

positioning a guide panel having a reversed L-shaped second wire fixation part extended in a width direction of a side of the guide panel on the top portion of the main support;

providing a second projection protruded from the second wire fixation part and put on the first projection;

mounting and securing the guide panel on the side of the main support such that the reversed L-shaped second wire fixation part is fitted and coupled to the L-shaped first wire fixation part; and pressing an upper edge of the liquid crystal display panel by using a top case and securing the same to the guide panel.

5. The method of claim 4, wherein the lamp assembly is inserted and secured to a side of the main support by sliding.

6. The method of claim 4, wherein the guide panel is positioned on the top portion of the main support such that the reversed L-shaped second wire fixation part of the guide panel corresponds to the L-shaped first wire fixation part of the main support.

* * * * *